US011007494B2

(12) United States Patent
Kim et al.

(10) Patent No.: US 11,007,494 B2
(45) Date of Patent: May 18, 2021

(54) RESIN COMPOSITION PREPARATION APPARATUS AND POLYUREA RESIN COMPOSITION PREPARED USING THE SAME

(71) Applicant: TOUCH GREEN CO., LTD., Chungcheongbuk-do (KR)

(72) Inventors: Young Woo Kim, Seoul (KR); Jong Jin Hong, Gyeongsangnam-do (KR); Seong Ho Yeom, Jeollanam-do (KR)

(73) Assignee: TOUCH GREEN CO., LTD., Chungcheongbuk-do (KR)

( * ) Notice: Subject to any disclaimer, the term of this patent is extended or adjusted under 35 U.S.C. 154(b) by 123 days.

(21) Appl. No.: 16/139,893

(22) Filed: Sep. 24, 2018

(65) Prior Publication Data

US 2020/0094200 A1 Mar. 26, 2020

(30) Foreign Application Priority Data

Sep. 20, 2018 (KR) ........................ 10-2018-0113019

(51) Int. Cl.
*B01F 3/04* (2006.01)
*B01F 3/22* (2006.01)
(Continued)

(52) U.S. Cl.
CPC ...... *B01F 3/04439* (2013.01); *B01F 3/04503* (2013.01); *B01F 3/04836* (2013.01);
(Continued)

(58) Field of Classification Search
CPC . A41D 19/04; B01F 3/04439; B01F 3/04836; B01F 3/2223; B01F 5/0451; B01F 5/04836; B01F 5/0615
See application file for complete search history.

(56) References Cited

U.S. PATENT DOCUMENTS

2018/0105007 A1 4/2018 Park
2018/0200927 A1 7/2018 Morikawa
2020/0045997 A1* 2/2020 Blevins .............. B01F 3/04503

FOREIGN PATENT DOCUMENTS

KR 10-2003-0010486 A 2/2003
KR 10-1056686 B1 8/2011
(Continued)

OTHER PUBLICATIONS

Machine translation for KR 101624476 to Choe et al. obtained from the European Patent Office website in Feb. 2021.*
(Continued)

*Primary Examiner* — Melissa A Rioja
(74) *Attorney, Agent, or Firm* — Studebaker & Brackett PC

(57) ABSTRACT

A resin composition preparation apparatus and a polyurea resin are provided. A resin introduction unit is configured to inject a composition solution and air mixed in the composition solution. An air bubble generator is connected to the resin introduction unit. An air bubble separation tank is connected to the air bubble generator. The air bubble generator comprises: an inlet through which the composition solution and the air are introduced from the resin introduction unit; an outlet through which the resin composition is discharged to the air bubble separation tank; and an internal flow channel connecting the inlet and the outlet so as to pass therethrough. The internal flow channel comprises a groove portion configured to form the air bubbles having a smaller particle size than that of the air.

6 Claims, 11 Drawing Sheets

(51) Int. Cl.

| | |
|---|---|
| ***B01F 5/04*** | (2006.01) |
| ***B01F 5/06*** | (2006.01) |
| ***C08G 18/08*** | (2006.01) |
| ***C08G 18/10*** | (2006.01) |
| ***C08G 18/32*** | (2006.01) |
| ***C08G 18/34*** | (2006.01) |
| ***C08G 18/38*** | (2006.01) |
| ***C08G 18/40*** | (2006.01) |
| ***C08G 18/75*** | (2006.01) |
| ***C08G 18/76*** | (2006.01) |
| ***C08L 75/02*** | (2006.01) |
| ***C09D 175/04*** | (2006.01) |

(52) U.S. Cl.

CPC ......... *C08G 18/0871* (2013.01); *C08G 18/14* (2013.01); *C08G 18/3278* (2013.01); *C08G 18/3844* (2013.01); *C08G 18/755* (2013.01); *C08G 18/7671* (2013.01); *C08L 75/02* (2013.01); *B01F 2003/0495* (2013.01); *B01F 2003/04872* (2013.01)

(56) References Cited

FOREIGN PATENT DOCUMENTS

| | | | |
|---|---|---|---|
| KR | 10-2012-0034877 | A | 4/2012 |
| KR | 10-2014-0065745 | A | 5/2014 |
| KR | 10-1624476 | B1 | 5/2016 |
| KR | 10-1721908 | B1 | 3/2017 |
| KR | 10-1832433 | B1 | 2/2018 |
| KR | 10-2018-0042588 | A | 4/2018 |
| KR | 10-2018-0083778 | A | 7/2018 |

OTHER PUBLICATIONS

A Notice of Allowance mailed by the Korean Intellectual Property Office dated Nov. 13, 2019, which corresponds to Korean Patent Application No. 10-2018-0113019 and is related to U.S. Appl. No. 16/139,893.

* cited by examiner

FIG. 9

RESIN COMPOSITION PREPARATION APPARATUS AND POLYUREA RESIN COMPOSITION PREPARED USING THE SAME

PRIORITY CLAIM

This application claims priority from Korean Patent Application No. 10-2018-0113019, filed on Sep. 20, 2018 in the Korean Intellectual Property Office, and all the benefits accruing therefrom under 35 U.S.C. § 119, the disclosure of which is incorporated herein by reference in its entirety.

BACKGROUND

1. Field of the Disclosure

The present disclosure relates to a resin composition preparation apparatus and a polyurea resin composition prepared using the same. More particularly, the present disclosure relates to a resin composition preparation apparatus, which includes an air bubble generator configured to generate air bubbles in a resin composition such that the air bubbles have a micrometer-unit size, and a polyurea resin composition prepared using the same.

2. Description of the Related Art

Conventionally, there is a method of impregnating a target object with a resin having permeability as a method of forming a film including the resin on the target object. In this case, the resin only permeates into the target object so that a film is not formed. Thus, to prevent a resin composition from permeating into a target object, a method of performing water-repellent treatment on a surface of the target object and impregnating the treated target object with the resin composition has been used. In this regard, the water-repellent treatment of the surface of the target object is performed using an alcohol, potassium hydroxide, calcium chloride, calcium nitrate, or the like, and in the case of alcohols, there is a risk of fire, and other chemical products are harmful to the human body. In addition, after producing products, surfaces of which have been subjected to water-repellent treatment, the products are washed again to remove chemicals and dried, and in these processes, it is difficult to perform complete washing and a lot of costs are incurred.

Thus, a resin capable of forming a coating film on a target object has been used, but in this case, the resin is not able to permeate into the target object and forms only a coating film, so that the target object and the resin are easily separated from each other.

Meanwhile, in a case in which a target object includes a fibrous material, when a coating film is formed using a resin, air permeability is required according to the application thereof. When a resin for forming a coating film, which is used in applications for leisure sports and sports or in a high-intensity or high-temperature working environment, has waterproofness, a wearer easily sweats, thus causing uncomfortable wearability. Therefore, a coating film including a resin needs to have air permeability according to applications of a target object.

SUMMARY

To form air bubbles in an existing resin composition, a method of forming air bubbles by stirring a resin composition by high-speed rotation has been used. As another method, in the case of an oil-based resin, in the solvent-water exchange process, a solvent is released out into water so that air bubbles are naturally formed, thereby providing air permeability. However, while air bubbles are easily generated in the case of oil-based resins, in the case of water-soluble resins, the generation of air bubbles is difficult, and the generated air bubbles easily disappear, thus causing production problems. In addition, when a general high-speed rotation device is used, the size of air bubbles formed in a resin composition is not uniform. In this case, a great amount of air bubbles with a big size are formed, and thus deteriorates the durability of a coating film formed of a resin, and when air bubbles are formed in a small amount, air permeability deteriorates.

Therefore, the present disclosure has been made to address various problems including the above-described problems, and an embodiment of the present disclosure provides an apparatus for preparing a polyurea resin composition capable of forming a coating film on a target object, which includes an air bubble generator configured to generate air bubbles in the resin composition, which is water-soluble, such that the air bubbles have a micrometer-unit size.

Another embodiment of the present disclosure provides a polyurea resin composition prepared using the above-described apparatus, wherein the polyurea resin composition forms a coating film by being coated on fiber or the like and also has air permeability due to air bubbles included therein.

However, aspects of the present invention are not restricted to the one set forth herein. The above and other aspects of the present invention will become more apparent to one of ordinary skill in the art to which the present invention pertains by referencing the detailed description of the present invention given below.

According to an exemplary embodiment of the present disclosure, a resin composition preparation apparatus comprising: a resin introduction unit configured to inject a composition solution and air mixed in the composition solution; an air bubble generator connected to the resin introduction unit such that the composition solution and the air are introduced thereinto, and configured to disperse at least a part of the air in the composition solution and discharge a resin composition obtained by dispersing air bubbles in the composition solution; and an air bubble separation tank connected to the air bubble generator such that the resin composition is introduced thereinto, configured to separate the remaining air, which is not dispersed in the composition solution, and connected to the resin introduction unit such that the resin composition is discharged to the resin introduction unit, wherein the air bubble generator comprises: an inlet through which the composition solution and the air are introduced from the resin introduction unit; an outlet through which the resin composition is discharged to the air bubble separation tank; and an internal flow channel connecting the inlet and the outlet so as to pass therethrough, wherein the internal flow channel comprises a groove portion configured to form the air bubbles having a smaller particle size than that of the air.

In an exemplary embodiment, wherein the groove portion is spirally formed along the internal flow channel from the inlet to the outlet, and the internal flow channel allows the air bubbles to be formed by convection applied as the air is rotated by the groove portion.

In an exemplary embodiment, wherein in the air bubble generator, the inlet has a greater diameter than that of the outlet.

In an exemplary embodiment, wherein the internal flow channel comprises a first area configured such that a length of the internal flow channel is monotonically decreased towards the other side at which the outlet is provided from one side at which the inlet is provided, the length being measured in a direction perpendicular to a direction in which the internal flow channel extends; and a second area configured such that the length is constant towards the other side at which the outlet is provided from the first area.

In an exemplary embodiment, wherein the resin introduction unit comprises: a resin supply tank to which the composition solution is supplied; a circulating pump connected to the resin supply tank via a first connection pipe and configured to transmit power to the composition solution of the resin supply tank and discharge the composition solution; a pressure pump connected to the circulating pump via a second connection pipe, connected to the air bubble generator via a third connection pipe, and configured to introduce the composition solution and the air into the air bubble generator; and an air compressor connected to at least one fourth connection pipe connected to the second connection pipe or the air bubble generator and configured to inject the air into the second connection pipe or the air bubble generator via the fourth connection pipe.

In an exemplary embodiment, wherein the air has a high pressure of about 3 bars to about 5 bars, and a flow rate of the injected high-pressure air ranges from about 200 cc/min to about 400 cc/min.

In an exemplary embodiment, wherein a flow rate of the composition solution discharged from the circulating pump ranges from about 40 L/min to about 60 L/min.

In an exemplary embodiment, wherein the air bubble generator is connected to the air bubble separation tank via a fifth connection pipe, the resin composition preparation apparatus further comprises an air bubble ejector connected to the air bubble separation tank via a sixth connection pipe and configured to separate and discharge the remaining air, which is not dispersed in the resin composition, and the air bubble separation tank is connected to the resin supply tank via a seventh connection pipe and configured to introduce, into the resin supply tank, the resin composition remaining after the remaining air is removed.

In an exemplary embodiment, wherein the air removed via the air bubble ejector has a greater mean particle size than that of the air bubbles dispersed in the resin composition introduced into the resin supply tank.

In an exemplary embodiment, wherein the resin supply tank further comprises a discharge valve configured to separate at least a part of the resin composition introduced via the seventh connection pipe.

In an exemplary embodiment, wherein the resin composition separated via the discharge valve comprises the air bubbles in an amount of about 10 parts by weight to about 15 parts by weight with respect to 100 parts by weight of the resin composition, and the air bubbles have a particle size ranging from about 45 μm to about 55 μm.

In an exemplary embodiment, wherein the composition solution comprises about 15 parts by weight to about 17.5 parts by weight of a polyol, about 0.5 part by weight to about 1.5 parts by weight of a dispersant, about 4.5 parts by weight to about 6.5 parts by weight of a first monomer, about 1 part by weight to about 2 parts by weight of a second monomer, and about 70 parts by weight to about 80 parts by weight of a solvent.

In an exemplary embodiment, wherein the dispersant comprises dimethylolpropionic acid (DMPA), the first monomer comprises methylene diphenyl diisocyanate (MDI) or isophoronediisocyanate (IPDI), and the second monomer comprises triethanolamine (TEA) or piperazine.

According to an exemplary embodiment of the present disclosure, a polyurea resin composition prepared using the resin composition preparation apparatus.

In an exemplary embodiment, wherein the polyurea resin composition comprises air bubbles in an amount of about 10 parts by weight to about 15 parts by weight with respect to 100 parts by weight of the polyurea resin composition, wherein pores are formed by the air bubbles, the pores allowing gas to permeate into the polyurea resin composition.

BRIEF DESCRIPTION OF THE DRAWINGS

The above and other aspects and features of the present disclosure will become more apparent by describing in detail exemplary embodiments thereof with reference to the attached drawings, in which:

FIGS. 9 to 11 are images showing industrial gloves coated with polyurea resin compositions prepared according to preparation examples.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

It will also be understood that when a layer is referred to as being “on” another layer or substrate, it can be directly on the other layer or substrate, or intervening layers may also be present. The same reference numbers indicate the same components throughout the specification.

It will be understood that, although the terms “first,” “second,” etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

As used herein, the term "and/or" includes any and all combinations of one or more of the associated listed items. A numerical range expressed using "to" means a range including numerical values before and after "to" as a lower limit and an upper limit, respectively. The term "about" or "approximately" as used herein refers to a value or numerical range within 20% of the value or numerical range described after the term.

Hereinafter, embodiments of the present disclosure will be described with reference to the accompanying drawings.

Figure 1:
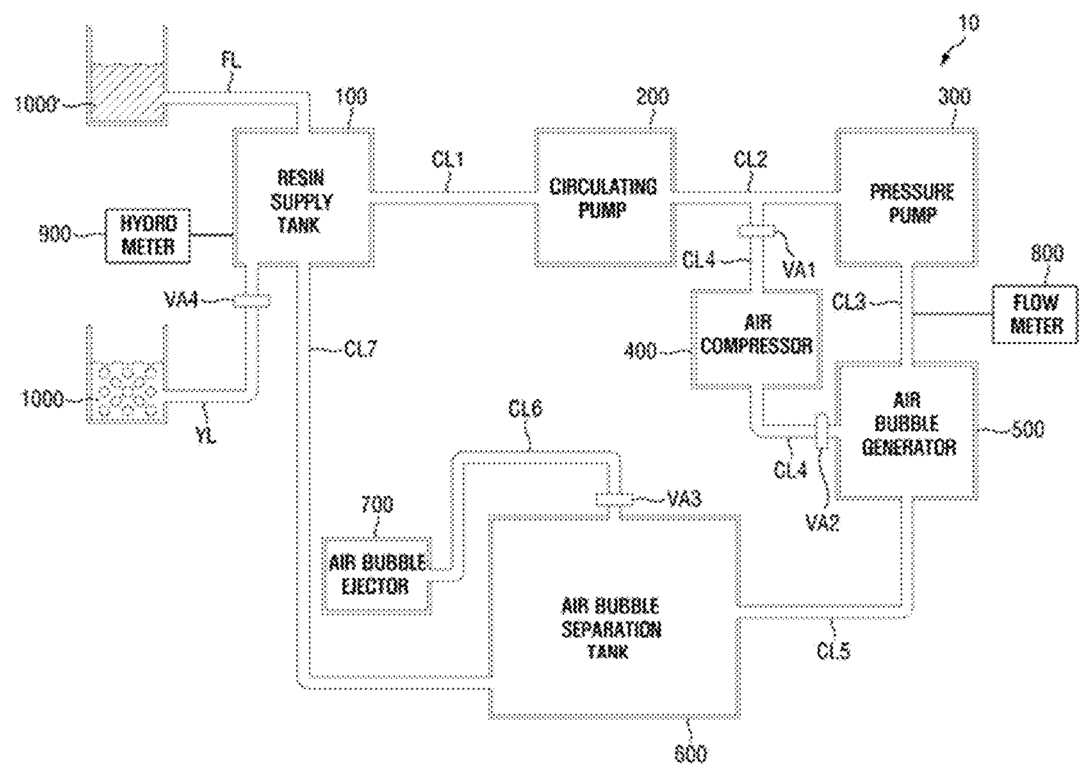
FIG. 1 is a schematic view of an apparatus for preparing a resin composition, according to an embodiment of the present disclosure.

FIG. 1 is a schematic view of a resin composition preparation apparatus 10 according to an embodiment of the present disclosure.

Referring to FIG. 1, the resin composition preparation apparatus 10 includes a resin introduction unit including a resin supply tank 100, a circulating pump 200, a pressure pump 300, and an air compressor 400, an air bubble generator 500, an air bubble separation tank 600, and an air bubble ejector 700.

The resin introduction unit introduces a composition solution 1000', which is a raw material of a resin composition 1000 which is a finally prepared object, into the air bubble generator 500. In addition, the resin composition 1000, which is a final composition obtained after the composition solution 1000' passes through the air bubble generator 500 and the air bubble separation tank 600, may be supplied to the resin introduction unit.

The resin supply tank 100 is a tank to which the composition solution 1000' is supplied. In the resin composition preparation apparatus 10, the resin supply tank 100 may be a tank to which the composition solution 1000', which is a raw material for the preparation of the resin composition 1000, is supplied, and the resin composition 1000 finally prepared through a circulating process is supplied. For example, the resin supply tank 100 may be a storage tank.

The composition solution 1000' may be supplied to the resin supply tank 100 via a supply connection pipe FL. In the resin composition preparation apparatus 10 according to an embodiment, the composition solution 1000' may be prepared into the resin composition 1000 in which air bubbles 1200 are dispersed, through a circulating process. The composition solution 1000' may form a coating film on a target object. The resin composition 1000 prepared using this and the resin composition preparation apparatus 10 not only may form a coating film on a target object, but may also have air permeability due to pores formed by the dispersed air bubbles 1200.

According to one embodiment, the composition solution 1000' may be a composition solution in which a polyurea resin is dispersed. In particular, the composition solution 1000' is a solution in which a polyurea resin is dispersed in a solvent, and may include about 15 parts by weight to about 17.5 parts by weight of a polyol, about 0.5 part by weight to about 1.5 parts by weight of a dispersant, about 4.5 parts by weight to about 6.5 parts by weight of a first monomer, about 1 part by weight to about 2 parts by weight of a second monomer, and about 70 parts by weight to about 80 parts by weight of a solvent. In addition, according to one embodiment, the dispersant may be dimethylolpropionic acid (DMPA), the first monomer may be methylene diphenyl diisocyanate (MDI) or isophorone diisocyanate (IPDI), and the second monomer may be triethanolamine (TEA) or piperazine.

The polyol may form a basic skeleton of a polyurea resin. A polyol contains hydroxyl groups in a molecule, and thus reacts with isocyanate groups, which will be described below, thereby forming a prepolymer. The type of a polyol is not particularly limited.

The dispersant may be added to the polyol to form a prepolymer, and may impart water solubility to a polyurea resin. In an exemplary embodiment, the dispersant may be DMPA, but the present disclosure is not limited thereto.

The polyurea resin includes a water-soluble dispersant, and thus may have water solubility, and the water-soluble dispersant may allow polyurea resin particles to be dispersed in the solvent. In this regard, properties of a coating film layer formed of the polyurea resin may be controlled by adjusting dispersibility, water solubility, or the like of the polyurea resin composition.

The first monomer may contain an isocyanate group. The isocyanate group may form a monomer in the polyurea resin by reacting with the polyol. In an exemplary embodiment, the first monomer containing an isocyanate group may be MDI or IPDI, but the present disclosure is not limited thereto.

In addition, the first monomer containing an isocyanate group may be hydrophilic, and thus the formed prepolymer may have hydrophilicity due to the dispersant and the first monomer.

The second monomer may contain an amine group, thereby leading to polymerization with the isocyanate group of the prepolymer. The isocyanate group of the first monomer included in the prepolymer may react with the amine group of the second monomer, thereby forming a urea group. In an exemplary embodiment, the second monomer containing an amine group may be piperazine or TEA, but the present disclosure is not limited thereto.

The solvent may be water ($H_2O$), and the second composition may be in a form dispersed in a solvent. When stirring is performed using a sufficient amount of the solvent, the finally prepared polyurea resin may form a soft and robust coating layer.

According to one embodiment, the composition solution in which a polyurea resin is dispersed may include about 15 parts by weight to about 17.5 parts by weight of the polyol, about 0.5 part by weight to about 1.5 parts by weight of the dispersant, about 4.5 parts by weight to about 6.5 parts by weight of the first monomer, about 1 part by weight to about 2 parts by weight of the second monomer, and about 70 parts by weight to about 80 parts by weight of the solvent.

In an exemplary embodiment, the composition solution in which a polyurea resin is dispersed may include 16.5 parts by weight of the polyol, 1.1 parts by weight of DMPA, 5.9 parts by weight of MDI and IPDI, 1.4 parts by weight of piperazine, and 75 parts by weight of water. However, the present disclosure is not limited to thereto.

In a case in which the above-described composition solution in which a plyurea resin is dispersed is used as the composition solution 1000', when an industrial glove is coated with the composition solution, the composition solution partially permeates into fiber tissue of the industrial glove, but does not permeate into an inner surface of the industrial glove, thereby forming an inner film layer, and a thin coating layer may be formed on an outer skin of the industrial glove. Accordingly, when coating an industrial glove, the resin composition does not permeate into an inner skin of the industrial glove, and thus the glove may be easily separated from a mold in a manufacturing process, and a coating layer formed on an outer skin thereof may have excellent durability.

However, in this case, a coating film including a polyurea resin does not have pores therein, and thus may have poor air permeability. Thus, by using the resin composition preparation apparatus 10 according to an embodiment, the resin composition 1000 in which the air bubbles 1200 with a small particle size are dispersed in a polyurea resin composition solution is prepared, and a coating film formed of the resin composition 1000 may have air permeability. This will be described below in detail.

Meanwhile, the resin supply tank 100 may be further connected to a seventh connection pipe CL7 and a discharge connection pipe YL. The resin composition 1000 finally obtained by the composition solution 1000' passing through the resin composition preparation apparatus 10 is supplied to the resin supply tank 100 from the air bubble separation tank 600, which will be described below, via the seventh connection pipe CL7. The resin composition 1000, which is a target material to be prepared, may be separated from the resin supply tank 100 via the discharge connection pipe YL. This will be described below in detail.

The composition solution 1000' may be supplied to the resin supply tank 100 via the supply connection pipe FL, and may be supplied to the circulating pump 200 via a first connection pipe CL1. That is, the resin supply tank 100 and the circulating pump 200 may be connected via the first connection pipe CL1. The circulating pump 200 may be a pump configured to transmit power to fluids so that the composition solution 1000' supplied to the resin composition preparation apparatus 10 can be circulated. The composition solution 1000' having received power by the circulating pump 200 may pass from the resin supply tank 100 to the circulating pump 200, the pressure pump 300, the air bubble generator 500, and the air bubble separation tank 600, and may be introduced back into the resin supply tank 100. According to one embodiment, the amount of the composition solution 1000' to be supplied from the circulating pump 200 may range from about 4 L/min to about 6 L/min, preferably 5 L/min. However, the present disclosure is not limited thereto.

The composition solution 1000' supplied to the circulating pump 200 may be supplied to the pressure pump 300 via a second connection pipe CL2. That is, the circulating pump 200 may be connected to the pressure pump 300 via the second connection pipe CL2. The pressure pump 300 may apply pressure to the supplied composition solution 1000'. In addition, the composition solution 1000' may be introduced in a state mixed with air 1500 at a high pressure, into the air bubble generator 500.

The air compressor 400 may inject the introduced air 1500 into the air bubble generator 500. The air compressor 400 may be connected to at least one fourth connection pipe CL4, and the fourth connection pipe CL4 may be connected to the second connection pipe CL2 or the air bubble generator 500. Accordingly, the air compressor 400 may inject the air 1500 into the second connection pipe CL2 or the air bubble generator 500.

In particular, the air compressor 400 may be connected to the second connection pipe CL2 via the fourth connection pipe CL4, and the fourth connection pipe CL4 may include a first valve VA1. The air compressor 400 may inject the high-pressure air 1500 into the second connection pipe CL2 depending on whether the first valve VA1 is opened or closed. The air 1500 injected into the second connection pipe CL2 may be mixed with the composition solution 1000' introduced from the circulating pump 200 to be introduced into the pressure pump 300.

Meanwhile, the pressure pump 300 may be connected to the air bubble generator 500 via a third connection pipe CL3, and the third connection pipe CL3 may be connected to a flow meter 800. The flow meter 800 may measure the amount of the air 1500 mixed with the composition solution 1000' passing through the third connection pipe CL3. That is, the flow meter 800 may measure the amount of the air 1500 introduced into the air bubble generator 500, and may adjust the amount of the air 1500 injected into the second connection pipe CL2 from the air compressor 400. However, the present disclosure is not limited thereto, and in some cases, the air compressor 400 may also inject the high-pressure air 1500 via another fourth connection pipe CL4 connected to the air bubble generator 500.

The air 1500 injected from the air compressor 400 may be dispersed in the finally prepared resin composition 1000, thereby forming the air bubbles 1200. For example, the air 1500 injected from the air compressor 400 may have a pressure of about 1 bar to about 4 bars. In addition, the air compressor 400 may inject the air 1500 at a flow rate of about 200 cc/min to about 300 cc/min. However, the present disclosure is not limited thereto.

The air 1500 to be injected from the air compressor 400 and the composition solution 1000' to be injected from the circulating pump 200 may be injected into the pressure pump 300 via the second connection pipe CL2, and the composition solution 1000' and the air 1500 may be mixed in the pressure pump 300. The pressure pump 300 may adjust an internal pressure thereof, and may apply a rotational force to the introduced composition solution 1000'. Accordingly, the high-pressure air 1500 introduced simultaneously with the composition solution 1000' in the pressure pump 300 may be uniformly mixed in the composition solution 1000'. Since the resin introduction unit of the resin composition preparation apparatus 10 according to an embodiment includes the resin supply tank 100, the circulating pump 200, the pressure pump 300, and the air compressor 400, the composition solution 1000' and the high-pressure air 1500 may be mixed to be introduced into the air bubble generator 500.

The pressure pump 300 may transmit a high pressure to the composition solution 1000' and the air 1500 that are to be introduced into the air bubble generator 500. Thus, as described below, the air bubbles 1200 generated in the air bubble generator 500 may be dispersed in the composition solution 1000' at a high pressure.

The composition solution 1000' mixed with the high-pressure air 1500 may be introduced into the air bubble generator 500 from the pressure pump 300 of the resin introduction unit. The high-pressure air 1500 may be broken into the air bubbles 1200 with a small particle size in the air bubble generator 500, and may be dispersed in the composition solution 1000' by the pressure transmitted by the pressure pump 300.

Figure 2:
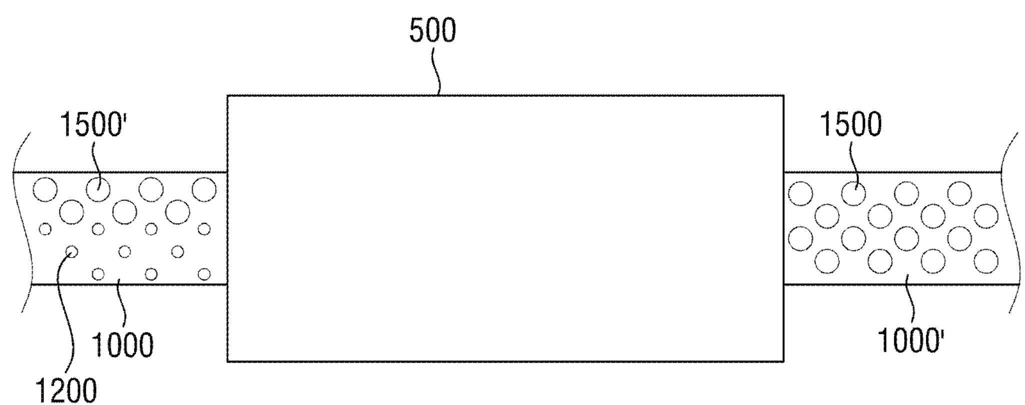
FIG. 2 is a schematic view of an air bubble generator, according to an embodiment of the present disclosure.
Figure 3:
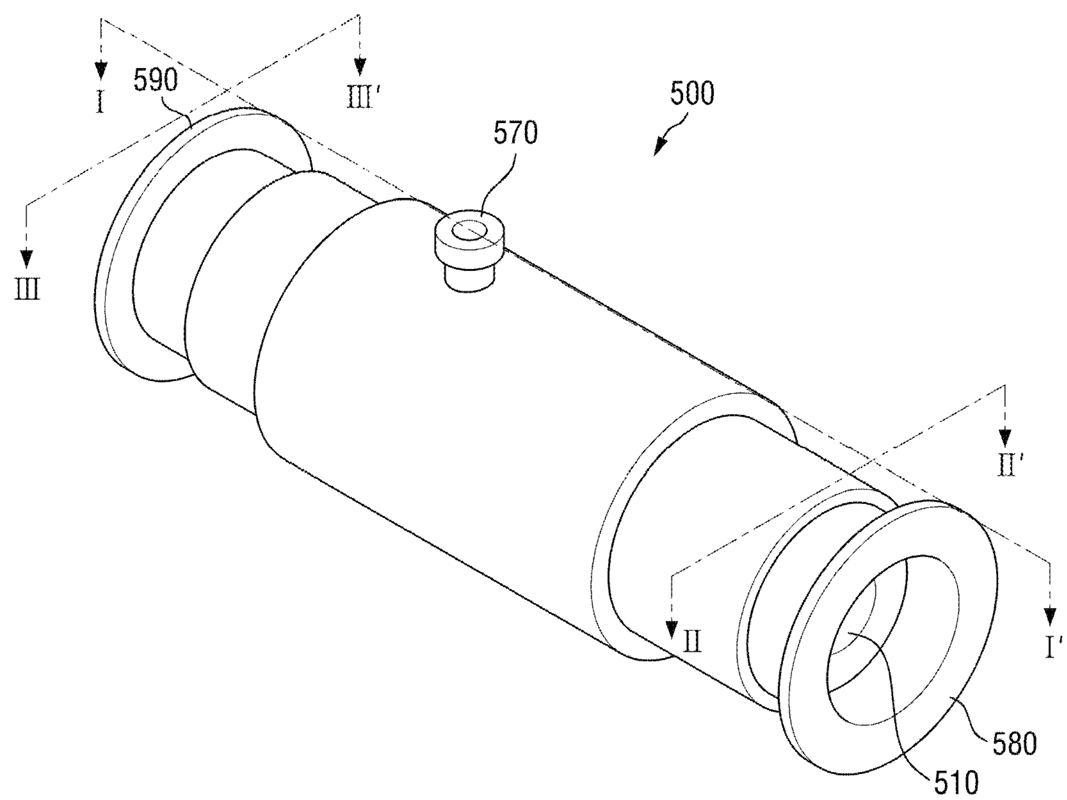
FIG. 3 is a perspective view of an air bubble generator, according to an embodiment of the present disclosure.

FIG. 2 is a schematic view of the air bubble generator 500, according to an embodiment of the present disclosure. FIG. 3 is a perspective view of the air bubble generator 500, according to an embodiment of the present disclosure.

The air bubble generator 500 includes a first fastening part 580 connected to the pressure pump 300 via the third connection pipe CL3, an inlet 510 through which the composition solution 1000' mixed with the high-pressure air 1500 is introduced from the third connection pipe CL3, an outlet 520 through which the resin composition 100 discharged from the air bubble generator 500 is discharged, and a second fastening part 590 connected to the air bubble separation tank 600 via a fifth connection pipe CL5.

The first fastening part 580 and the second fastening part 590 may be coupled to the third connection pipe CL3 and the fifth connection pipe CL5, respectively. The composition solution 1000' mixed with the high-pressure air 1500 may be introduced into the air bubble generator 500 from the pressure pump 300 via the third connection pipe CL3 coupled to the first fastening part 580. In addition, the air bubble generator 500 may discharge the resin composition 1000, in which the air bubbles 1200 with a small particle size are dispersed, into the air bubble separation tank 600 via the fifth connection pipe CL5 coupled to the second fastening part 590.

At one side of the air bubble generator 500 at which the first fastening part 580 is provided, the inlet 510 through which the composition solution 1000' mixed with the high-pressure air 1500 is introduced is provided. At the other of the air bubble generator 500 at which the second fastening part 590 is provided, the outlet 520, through which the resin composition 1000 in which the air bubbles 1200 with a small particle size are dispersed is discharged, is provided. The high-pressure air 1500 introduced through the inlet 510 is broken into the air bubbles 1200 with a small particle size, and the air bubbles 1200 are dispersed in the composition solution 1000' to form the resin composition 1000. The resin composition is discharged via the outlet 520 to be introduced into the air bubble separation tank 600 via the fifth connection pipe CL5.

Figure 4:
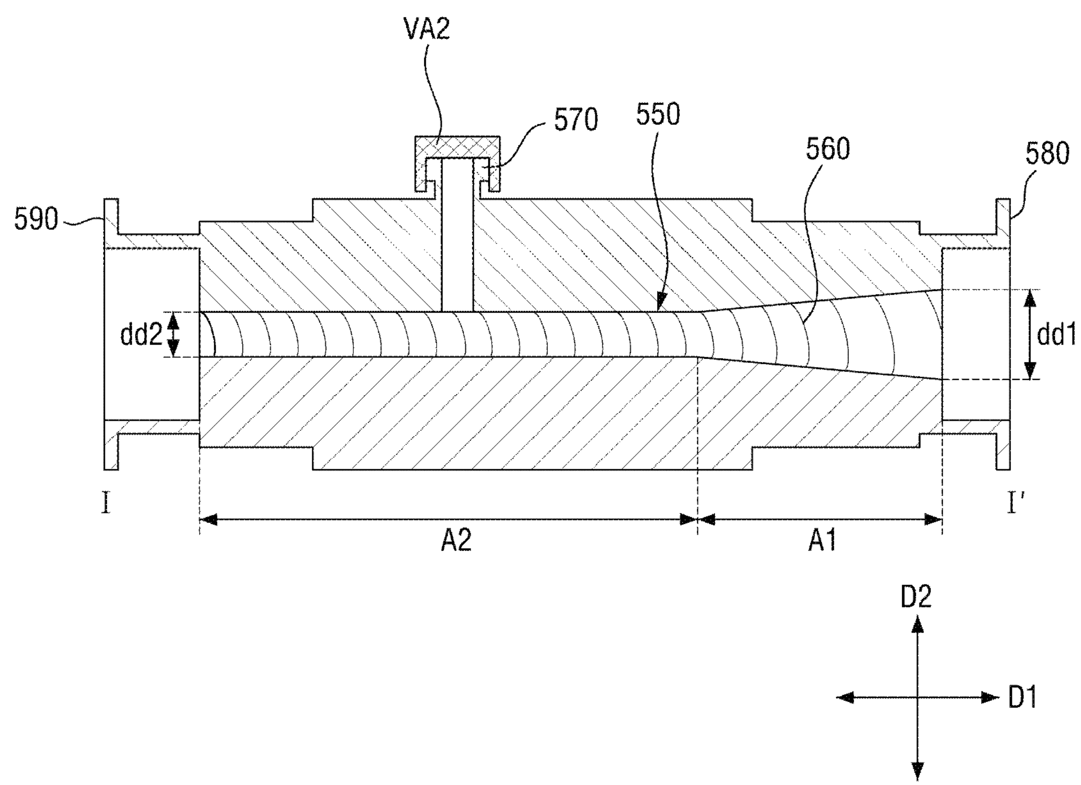
FIG. 4 is a cross-sectional view taken along line I-I' of FIG. 3.

FIG. 4 is a cross-sectional view taken along line I-I' of FIG. 3.

Referring to FIGS. 3 and 4, according to one embodiment of the present disclosure, the air bubble generator 500 may include an internal flow channel 550 connecting the inlet 510 and the outlet 520 so as to pass therethrough. The internal flow channel 550 may extends in a first direction, which is an axial direction of the air bubble generator 500, such that the internal flow channel 550 connects the inlet 510 and the outlet 520 so as to pass therethrough. That is, the internal flow channel 550 may be linearly provided in the air bubble generator 500.

The composition solution 1000' introduced via the inlet 510 may move along the internal flow channel 550, may form the resin composition 1000 in which the air bubbles 1200 with a small particle size are dispersed, and may be discharged via the outlet 520.

According to one embodiment of the present invention, the internal flow channel 550 of the air bubble generator 500 may include a groove portion 560 configured to form the air bubbles 1200 (see FIG. 2) having a smaller particle size than that of the high-pressure air 1500 introduced via the inlet 510.

The internal flow channel 550 of the air bubble generator 500 may include the groove portion 560 extending from the inlet 510 to the outlet 520. Due to the groove portion 560 formed along the internal flow channel 550, convection may form in the composition solution 1000' and the air 1500 which are introduced via the inlet 510. In particular, when the convection formed by the groove portion 560 is applied to the air 1500, the air 1500 may be broken into the air bubbles 1200 having a small particle size. Accordingly, the air bubbles 1200 formed by the groove portion 560 of the internal flow channel 550 may be dispersed in the composition solution 1000'.

In addition, according to an embodiment of the present invention, the groove portion 560 may be spirally formed along the internal flow channel 550 from the inlet 510 to the outlet 520, and the air bubbles 1200 may be formed in the internal flow channel 550 by convection applied as the air 1500 is rotated by the groove portion 560.

As illustrated in FIG. 4, the groove portion 560 may be spirally formed along the internal flow channel 550 from the inlet 510 to the outlet 520. The groove portion 560 in a spiral form may rotate the introduced composition solution 1000' and the introduced air 1500, and as the fluids rotate, convection may be more strongly applied. That is, since the groove portion 560 of the internal flow channel 550 is spirally formed, stronger convection due to the rotational force may be applied to the composition solution 1000' and the air 1500, and the air bubbles 1200 having a small particle size may be formed.

Meanwhile, outer diameters of the first fastening part 580 and the second fastening part 590 may be the same as that of a central portion of the air bubble generator 500, and may be greater than those of the inlet 510 and the outlet 520 provided at opposite sides of the air bubble generator 500. That is, a cross-sectional diameter of the air bubble generator 500, which is taken in a second direction D2 perpendicular to a first direction D1 in which the introduced composition solution 1000' moves, may be repeatedly increased and decreased in the first direction D1.

The outer diameter of the air bubble generator 500 decreases towards the inlet 510 from the first fastening part 580. The outer diameter of the air bubble generator 500 may have a recessed form towards the first direction D1 from the first fastening part 580. The outer diameter of the air bubble generator 500 is repeatedly increased and decreased towards the outlet 520 from the inlet 510. That is, the outer diameter of the central portion between the inlet 510 and the outlet 520 of the air bubble generator 500 may be greater than those of the inlet 510 and the outlet 520.

In contrast, inner diameters of the inlet 510 and the outlet 520 may be different from the outer diameter of the air bubble generator 500. According to one embodiment of the present disclosure, in the air bubble generator 500, the inner diameter of the inlet 510 may be greater than that of the outlet 520.

Figure 5:
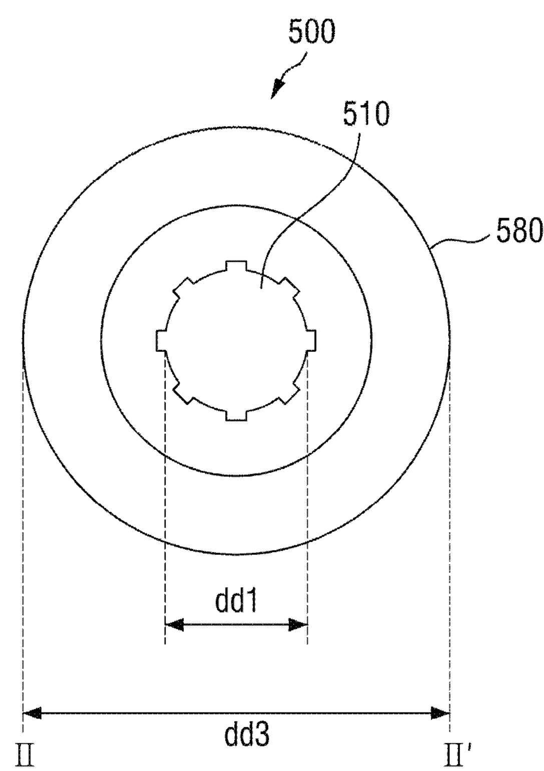
FIG. 5 is a cross-sectional view taken along line II-II' of FIG. 3.
Figure 6:
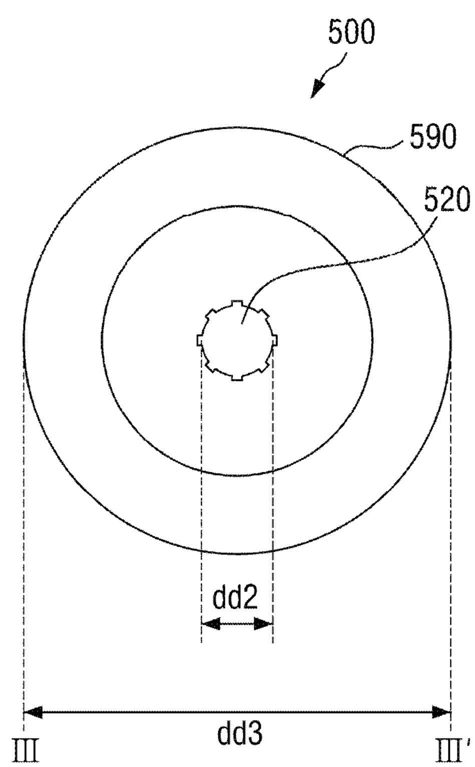
FIG. 6 is a cross-sectional view taken along line III-III' of FIG. 3.

FIG. 5 is a cross-sectional view taken along line II-II' of FIG. 3. FIG. 6 is a cross-sectional view taken along line III-III' of FIG. 3.

Referring to FIGS. 4 to 6, the inlet 510 and the outlet 520 of the air generator 500 may have a circular cross-sectional shape. Each of inner diameters dd1 and dd2 of the inlet 510 and the outlet 520 may be smaller than a diameter dd3 of the first fastening part 580 and the second fastening part 590. In other words, the inlet 510 and the outlet 520 may be formed so as to be inwardly recessed towards a central axis from an outer surface of the air bubble generator 500.

The inner diameter dd1 of the inlet 510 may be greater than the inner diameter dd2 of the outlet 520. In the air bubble generator 500, the internal flow channel 550 through which the composition solution 1000' flows may have a smaller inner diameter at the other side at which the outlet 520 is provided than at the one side at which the inlet 510 is provided. Accordingly, the composition solution 1000' to be introduced into the air bubble generator 500 may be introduced into the inlet 510 having a larger diameter and discharged via the outlet 520 having a smaller diameter, so that a flow rate becomes faster. Accordingly, as described above, the air 1500 which is broken into the air bubbles 1200 having a small particle size by the groove portion 560 of the internal flow channel 550 may be dispersed in the composition solution 1000' while flowing at a rapid speed.

In addition, referring back to FIG. 4, the internal flow channel 550 may include a first area A1 in which a length of the internal flow channel 500, which is measured in a direction perpendicular to a direction in which the internal flow channel 500 extends, is monotonically decreased towards the other side at which the outlet 520 is provided from the one side at which the inlet 510 is provided, and a second area A2 in which the length of the internal flow channel 500 is constant towards the other side at which the outlet 520 is provided from the first area A1.

The internal flow channel 550 includes the first area A1 in which the inner diameter of the internal flow channel 550 is monotonically decreased from the inner diameter of the inlet 510. In the first area A1, as the inner diameter of the internal flow channel 550 is continuously decreased, a flow rate of the introduced composition solution 1000' may become faster.

The internal flow channel 550 has a constant inner diameter towards the outlet 520 from the first area A1. The flow rate of the introduced composition solution 1000' becomes sufficiently fast due to the narrowed inner diameter in the first area A1, and then the composition solution 1000' passes through the second area A2 in which the inner diameter of the internal flow channel 550 is maintained constant, thereby forming the resin composition 1000 in which the air bubbles 1200 are dispersed.

Accordingly, the air bubble generator 500 may apply convection due to the rotational force by the groove portion 560 in a spiral form to the introduced composition solution 1000'. The air 1500 introduced into the air bubble generator 500 is broken into the air bubbles 1200 having a small particle size, and the flow rate thereof becomes faster while the air bubbles pass through the first area A1 and the second area A2 of the internal flow channel 550. Accordingly, the air bubbles 1200 having a small particle size formed in the air bubble generator 500 may be dispersed in the composition solution 1000', and as a result, the resin composition 1000 may be formed. In particular, the air bubble generator 500 may maintain a high pressure condition by the pressure pump 300. Although the composition solution 1000' has water solubility, the air bubble generator 500 has a structure in which the diameter thereof is decreased towards the outlet 520 from the inlet 510 and applies a fast flow rate and rotational force under a high pressure condition via the internal flow channel 550 including the groove portion 560 in a spiral form, thereby forming the resin composition 1000 in which the air bubbles 1200 are dispersed. The resin composition 1000 may be discharged via the outlet 520 of the air bubble generator 500 to be introduced into the air bubble separation tank 600 via the fifth connection pipe CL5.

Meanwhile, as illustrated in FIGS. 2 and 3, the air bubble generator 500 may further include an air inlet 570, and the air inlet 570 may be connected to the air compressor 400 via the fourth connection pipe CL4. As described above, the air compressor 400 may be connected to at least one fourth connection pipe CL4, and may inject the high-pressure air 1500 into the second connection pipe CL2 or the air bubble generator 500 via the fourth connection pipe CL4. The fourth connection pipe CL4 connected to the air bubble generator 500 may include a second valve VA2 configured to adjust the amount of the high-pressure air 1500 injected into the air bubble generator 500.

The flow meter 800 connected to the third connection pipe CL3 may measure the amount of the high-pressure air 1500 mixed in the composition solution 1000' to be introduced into the air bubble generator 500. When the amount of the high-pressure air 1500, which is measured by the flow meter 800, is insufficient, the air compressor 400 may directly inject the high-pressure air 1500 into the air bubble generator 500 via the air inlet 570. Accordingly, the air compressor 400 may adjust the amount of the high-pressure air 1500 injected into the second connection pipe CL2 or the air inlet 570, thereby adjusting the amount of the air bubbles 1200 dispersed in the resin composition 1000 discharged from the air bubble generator 500.

Referring back to FIG. 1, the resin composition 1000 discharged via the outlet 520 of the air bubble generator 500 and remaining air 1500' which is not dispersed in the resin composition 1000 are introduced into the air bubble separation tank 600.

Figure 7:
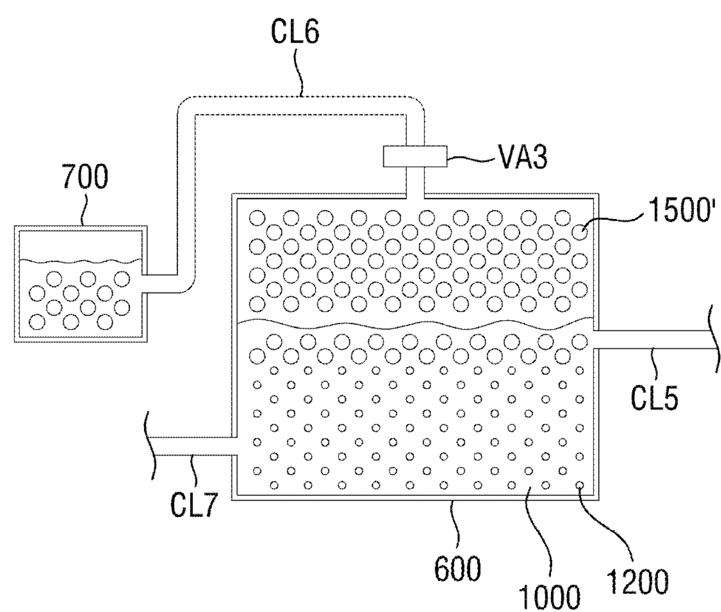
FIG. 7 is a schematic view illustrating an air bubble separation tank and an air bubble ejector, according to an embodiment of the present disclosure.

FIG. 7 is a schematic view illustrating the air bubble separation tank 600 and the air bubble ejector 700, according to an embodiment of the present disclosure.

Referring to FIG. 7, the air bubble separation tank 600 may be connected to the air bubble generator 500 via the fifth connection pipe CL5, and the resin composition 1000 and the remaining air 1500' which is not dispersed in the resin composition 1000 may be introduced into the air bubble separation tank 600 via the fifth connection pipe CL5. The air bubble separation tank 600 may be connected to the fifth connection pipe CL5, which is a pipe through which a fluid is introduced, the sixth connection pipe CL6 through which the remaining air 1500' which is not dispersed in the resin composition 1000 is discharged, and a seventh connection pipe CL7 through which the resin composition 1000 is discharged.

The air bubble separation tank 600 may include a separate discharge valve, and thus may adjust an internal pressure of the air bubble separation tank 600. To separate the resin composition 1000 and the remaining air 1500', which is not dispersed in the resin composition 1000, that are introduced into the air bubble separation tank 600 from the air bubble generator 500, the air bubble separation tank 600 may maintain an appropriate pressure. According to one embodiment, the air bubble separation tank 600 may maintain a pressure of about 4 bars to about 6 bars. However, the present disclosure is not limited thereto.

The sixth connection pipe CL6 connected to the air bubble separation tank 600 may be provided at a greater height than that of the fifth connection pipe CL5 through which the resin composition 1000 is introduced. In addition, the seventh connection pipe CL7 connected to the air bubble separation tank 600 may be provided at a lower height than that of the fifth connection pipe CL5.

According to one embodiment of the present disclosure, the resin composition preparation apparatus 10 may further include the air bubble ejector 700 that is connected to the air bubble separation tank 600 via the sixth connection pipe CL6 and is configured to separate and discharge the remaining air 1500', which is not dispersed in the resin composition 1000, of the air 1500, and the air bubble separation tank 600 may be connected to the resin supply tank 100 via the seventh connection pipe CL7, and may introduce the resin composition 1000 remaining after removing the remaining air 1500' into the resin supply tank 100.

First, the resin composition 1000 introduced via the fifth connection pipe CL5 may be placed in a lower portion of the air bubble separation tank 600, and the remaining air 1500' which is not dispersed in the resin composition 1000 may be placed in an upper portion of the air bubble separation tank 600. Accordingly, the air bubble separation tank 600 may discharge the resin composition 1000 placed in the lower portion thereof to the resin supply tank 100 via the seventh connection pipe CL7, and may discharge the undispersed remaining air 1500' placed in the upper portion thereof via the sixth connection pipe CL6.

The air bubble ejector 700 may be connected to the air bubble separation tank 600 via the sixth connection pipe CL6, and the remaining air 1500' which is not dispersed in the resin composition 1000 may be introduced into the air bubble ejector 700 from the air bubble separation tank 600.

According to one embodiment of the present disclosure, the air bubble separation tank 600 may be connected to the air bubble ejector 700 via the sixth connection pipe CL6, and the sixth connection pipe CL6 may include a third valve VA3 allowing the undispersed remaining air 1500' placed in the upper portion of the air bubble separation tank 600 to be discharged therethrough. For example, the third valve VA3 may be a valve configured to eject the air bubbles 1200. Accordingly, among fluids introduced into the air bubble separation tank 600, only the resin composition 1000, which is a target material to be prepared, may be discharged into the resin supply tank 100 via the seventh connection pipe CL7.

In one embodiment, the remaining air 1500' removed via the air bubble ejector 700 may have a greater mean particle size than that of the air bubbles 1200 dispersed in the resin composition 1000 introduced into the resin supply tank 100. The air bubbles 1200 having a small particle size may be dispersed in the resin composition 1000 formed in the air bubble generator 500, and as described above, the air bubbles 1200 may have a micrometer-unit particle size. However, the remaining air 1500' having a large particle size since it is not broken into a sufficiently small size in the air bubble generator 500 may be introduced into the air bubble separation tank 600 simultaneously with the resin composition 1000. The remaining air 1500' having a large particle size may be placed in an upper portion of the air bubble separation tank 600, and may be separated into the air bubble ejector 700 via the sixth connection pipe CL6.

The air bubble separation tank 600 may separate the resin composition 1000 including the air bubbles 1200 that have been broken into a micrometer-unit particle size and have been dispersed therein, and the remaining air 1500' that is not broken in the air bubble generator 500 and has a large particle size. As described above, the remaining air 1500' is separated into the air bubble ejector 700, and the resin composition 1000 is introduced into the resin supply tank 100 via the seventh connection pipe CL7. Accordingly, in the prepared resin composition 1000, the dispersed air bubbles 1200 may have a micrometer-unit particle size.

Meanwhile, referring back to FIG. 1, the air bubble separation tank 600 is connected to the resin supply tank 100 of the resin introduction unit via the seventh connection pipe CL7. The remaining air 1500' that is not dispersed in the resin composition 1000 and has a large particle size is separated into the air bubble ejector 700 from the air bubble separation tank 600, and the resin composition 1000 is introduced back into the resin supply tank 100 via the seventh connection pipe CL7.

According to one embodiment of the present disclosure, the resin supply tank 100 may further include a discharge valve configured to separate at least a part of the resin composition 1000 introduced via the sixth connection pipe CL6.

As illustrated in FIG. 1, the resin supply tank 100 may discharge the prepared resin composition 1000 via a production connection pipe YL. The production connection pipe YL may include a fourth valve VA4, and thus the resin composition 1000 introduced into the resin supply tank 100 may be separated by adjusting opening or closing of the fourth valve VA4. For example, the fourth valve VA4 may be a discharge valve.

In addition, according to one embodiment, the resin composition 1000 separated via the discharge valve may include the air bubbles 1200 in an amount of about 10 parts by weight to about 15 parts by weight with respect to 100 parts by weight of the resin composition 1000, and the air bubbles 1200 may have a size ranging from about 45 μm to about 55 μm.

In the resin composition 1000 prepared using the resin composition preparation apparatus 10, the air bubbles 1200 dispersed in a polymer resin 1100 may have a micrometer-unit size. For example, the size of the air bubbles 1200 may range from about 45 μm to about 55 μm, preferably 50 μm. In addition, in order for pores 1300 formed by the air bubbles 1200 not to be exposed at the surface of the resin composition 1000, the air bubbles 1200 may be included in an appropriate amount. The amount of the air bubbles 1200 may range from about 10 parts by weight to about 15 parts by weight, preferably 15 parts by weight, with respect to 100 parts by weight of the resin composition 1000.

The resin supply tank 100 may be connected to a hydrometer 900. The hydrometer 900 may measure the specific gravity of the resin composition 1000 introduced into the resin supply tank 100. According to the specific gravity of the resin composition 1000 measured by the hydrometer 900, the amount of the air bubbles 1200 dispersed in the resin composition 1000 may be calculated, and accordingly, the fourth valve VA4 included in the production connection pipe YL may be adjusted to separate the resin composition 1000 from the resin supply tank 100.

As described above, the composition solution 1000' supplied to the resin composition preparation apparatus 10 may be a composition solution in which a polyurea resin is dispersed. Accordingly, the prepared resin composition 1000 may be a polyurea resin composition. The polyurea resin composition, which is water-soluble, may be coated onto a target object to form a coating film, and may also have air permeability due to the air bubbles 1200 dispersed in the polyurea resin composition.

Figure 8:
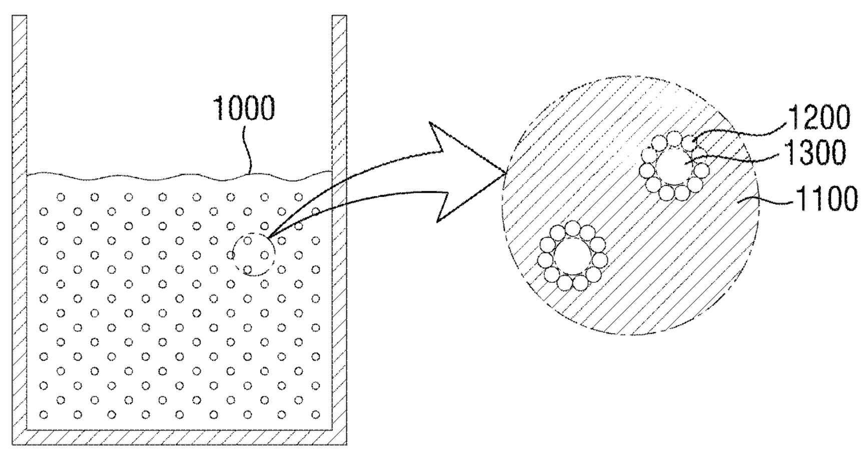
FIG. 8 is a schematic view of a polyurea resin composition according to an embodiment of the present disclosure.

FIG. 8 is a schematic view illustrating a polyurea resin composition according to an embodiment of the present disclosure.

Referring to FIG. 8, the polyurea resin composition according to an embodiment may include the air bubbles 1200 in an amount of about 10 parts by weight to about 15 parts by weight with respect to 100 parts by weight of the polyurea resin composition, and may include the pores 1300 formed by the air bubbles 1200, and thus gas may permeate thereinto through the pores 1300.

The resin composition 1000 may be a polyurea resin composition, and the polyurea resin composition may include the polymer resin 1100 including a polyurea resin, and the pores 1300 formed by the air bubbles 1200 dispersed in the resin composition 1000. The pores 1300 formed by the air bubbles 1200 may provide a path through which gas passes when a target object is coated with the polyurea resin composition to form a coating film thereon. Since the air bubbles 1200 have a micrometer-unit size, the pores 1300 formed by the air bubbles 1200 may also have a micrometer-unit size. Accordingly, a coating film formed of the polyurea resin composition may be configured such that the pores 1300 are not exposed at an outer surface thereof and gas passes through the pores 1300, and thus may have excellent durability and excellent air permeability.

As described above, the resin composition preparation apparatus 10 includes the resin introduction unit, the air bubble generator 500, and the air bubble separation tank 600, and by using the resin composition preparation apparatus 10, the resin composition 1000 in which the air bubbles 1200 having a micrometer-unit size are dispersed may be prepared. The composition solution 1000' including the high-pressure air 1500 mixed therein may be introduced into the air bubble generator 500 from the resin introduction unit. The air bubble generator 500 includes the groove portion 560 in a spiral form and the internal flow channel 550 having a diameter that partially decreases towards the outlet 520 from the inlet 510, and thus may disperse the high-pressure air 1500 in the composition solution 1000' and discharge the resin composition 1000. In addition, the resin composition 1000 discharged from the air bubble generator 500 may be introduced into the air bubble separation tank 600, and the air bubble separation tank 600 may separate the remaining air 1500' that is not dispersed in the resin composition 1000 and has a large particle size and introduce the resin composition 1000 back into the resin supply tank 100. Accordingly, the prepared resin composition 1000 may include the pores 1300 formed by the air bubbles 1200 dispersed in the polymer resin 1100, and thus air permeability may be secured.

Hereinafter, the present disclosure will be described according to the following examples and an experimental example to aid in understanding of the present disclosure. However, these examples and experimental example are provided for illustrative purposes only and are not intended to limit the scope of the present disclosure.

EXAMPLES

Preparation Example 1. Preparation of Polyurea Resin Composition (1)

First, 20 kg of a water-soluble polyurea resin solution as a composition solution is put in a resin supply tank. In this regard, to secure fluidity such that the resin composition is circulated in a resin composition preparation apparatus, the polyurea resin solution is maintained at a temperature of 40° C.

Next, all valves in the resin composition preparation apparatus are opened and a circulating pump is operated. At this time, the circulating pump is operated such that the amount of the polyurea resin solution ejected from the circulating pump is 5 L/min.

A pressure pump is operated at a time at which the polyurea resin solution is circulated to the resin supply tank by the circulating pump. At this time, a discharge valve provided in an air bubble separation tank is controlled such that an internal pressure of the air bubble separation tank is maintained at about 5 bars.

In a state in which the internal pressure of the air bubble separation tank is maintained at 5 bars, a valve connected to a fourth connection pipe is opened to inject air into a second connection pipe from an air compressor. At this time, the amount of the air injected into the second connection pipe from the air compressor is maintained at 200 cc/min using a flow meter. When the amount of injected air is too large, a great amount of big air bubbles is generated in the polyurea resin solution, and thus it is difficult to prepare a desired resin. When the amount of injected air is too small, the amount of generated air bubbles is small, and a lot of time is required to operate the apparatus.

Next, a valve provided at an upper portion of the air bubble separation tank is opened to discharge air bubbles having a large size inside the air bubble separation tank to an air bubble ejector. When the valve is opened too much, the polyurea resin solution is discharged along therewith, and thus opening or closing of the valve is controlled.

The finally prepared polyurea resin composition is present in a state in which air bubbles are dispersed in the composition, and the percentage of the dispersed air bubbles may be measured by a hydrometer. When the prepared polyurea resin composition is circulated to the resin supply tank, the specific gravity thereof is measured using a hydrometer, and when a polyurea resin composition having the desired percentage of air bubbles is prepared, operation of the circulating pump and the pressure pump is stopped. In addition, a valve of the air compressor is closed and the polyurea resin composition is separated from the resin supply tank. A suitable percentage of air bubbles in the polyurea resin composition ranges from 10% to 20%, and in the present preparation example, when the percentage of air bubbles reaches 15%, operation of the circulating pump and the pressure pump is stopped. Accordingly, a polyurea resin composition including air bubbles having a size of about 50 μm and a specific gravity of about 15% with respect to a total specific gravity was prepared. The prepared polyurea resin composition is hereinafter referred to as Preparation Example 1.

Preparation Example 2

A polyurea resin composition is prepared in the same manner as in Preparation Example 1, except that the pressure of the air bubble separation tank is maintained at 3 bars, and air is injected at a flow rate of 500 cc/min from the air compressor. The prepared polyurea resin composition is hereinafter referred to as Preparation Example 2.

Preparation Example 3

A polyurea resin composition is prepared in the same manner as in Preparation Example 1, except that the amount of the polyurea resin solution ejected from the circulating pump is 10 L/min, the pressure of the air bubble separation tank is maintained at 6 bars, and air is injected at a flow rate of 100 cc/min from the air compressor. The prepared polyurea resin composition is hereinafter referred to as Preparation Example 3.

[Table 1] summarizes preparation conditions of the polyurea resin compositions prepared according to Preparation Examples 1 to 3

TABLE 1

| | Preparation Example 1 | Preparation Example 2 | Preparation Example 3 |
|---|---|---|---|
| Resin supply tank | Polyurea resin solution 20 kg, 40° C. | Polyurea resin solution 20 kg, 40° C. | Polyurea resin solution 20 kg, 40° C. |
| Circulating pump | 5 L/min | 5 L/min | 10 L/min |
| Air compressor | 200 cc/min | 500 cc/min | 100 cc/min |
| Air bubble separation tank | 5 bar | 3 bar | 6 bar |
| Percentage of air bubbles (specific gravity) | 15% | 15% | 15% |

Experimental Example. Evaluation of Coating Film Formability of Prepared Polyurea Resin Composition An industrial glove was coated with each of the polyurea resin compositions of Preparation Examples 1 to 3, and it was evaluated whether or not the polyurea resin composition formed a coating film on the industrial glove. The industrial gloves coated with the polyurea resin compositions of Preparation Examples 1 to 3 are illustrated in FIGS. 9 to 11.

Figure 10:
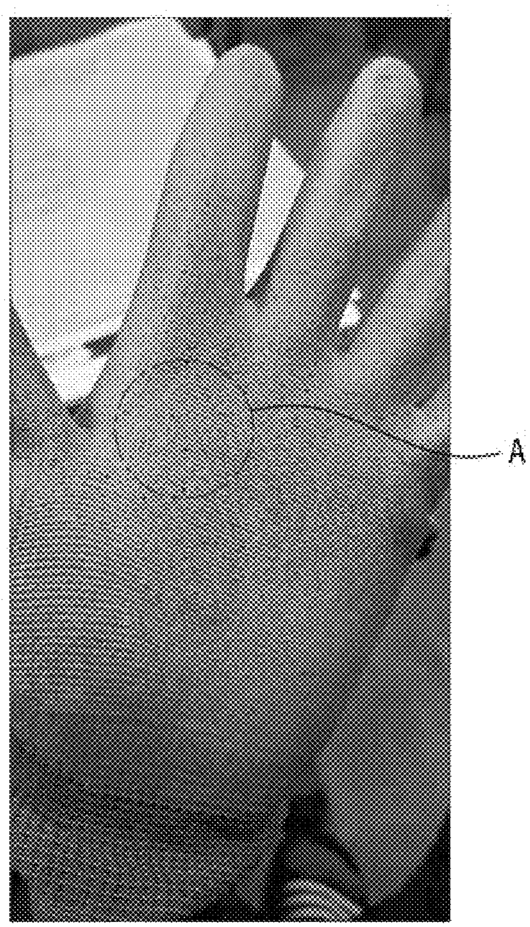
Figure 11:
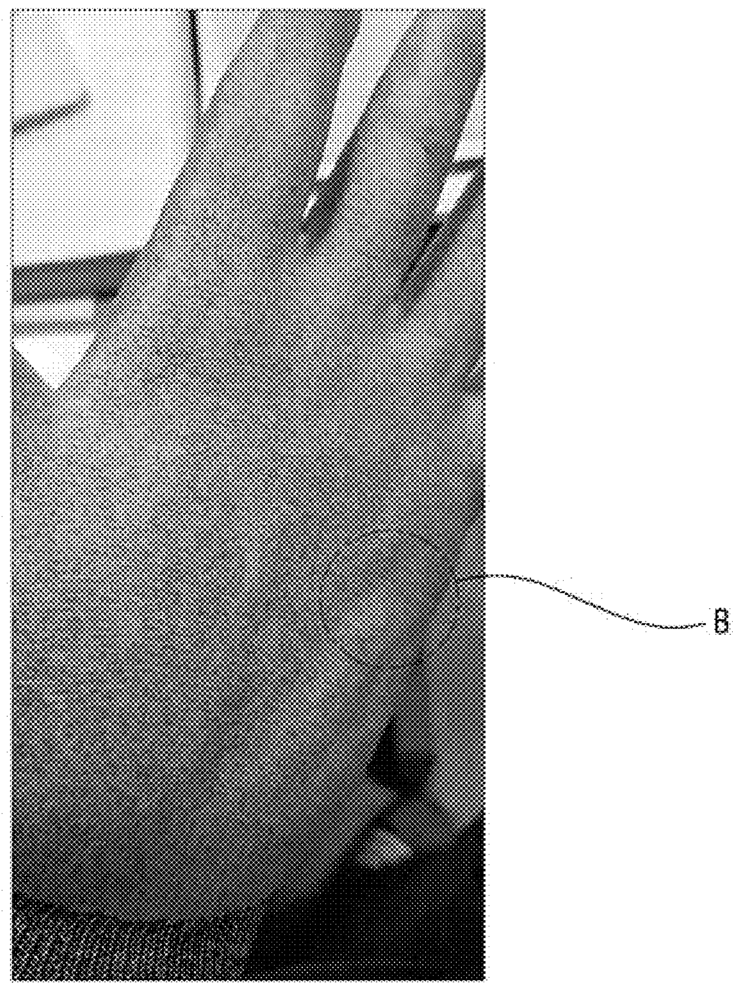

FIGS. 9 to 11 are images showing gloves coated with polyurea resin compositions according to preparation examples. FIG. 9 is an image showing an outer surface of the glove coated with the polyurea resin composition of Preparation Example 1, FIG. 10 is an image showing an outer surface of the glove coated with the polyurea resin composition of Preparation Example 2, and FIG. 11 is an image showing an outer surface of the glove coated with the polyurea resin composition of preparation Example 3.

Referring to FIGS. 9 to 11, it can be seen that coating films are formed on outer surfaces of all of the industrial gloves coated with the polyurea resin compositions of Preparation Examples 1 to 3. However, since the amounts of air bubbles dispersed in the polyurea resin compositions of Preparation Examples 1 to 3 are different from one another, the surface quality of each coating film may be different.

First, as illustrated in FIG. 9, it can be seen that in the case of Preparation Example 1, air bubbles having a micrometer-unit size are dispersed in the polyurea resin composition, and thus the coating film including Preparation Example 1 and formed on the industrial glove has micropores not visually observed at a surface thereof. Accordingly, the industrial glove may have a smooth surface and secured air permeability due to the micropores.

In contrast, as illustrated in FIG. 10, in the case of Preparation Example 2, a great amount of air bubbles having a large diameter is generated in the polyurea resin composition, and thus air bubbles having not been removed by the air bubble ejector may remain. Accordingly, the coating film including Preparation Example 2 and formed on the industrial glove may have pin holes as illustrated in portion A of FIG. 10 and deteriorated durability.

In addition, as illustrated in FIG. 11, in the case of Preparation Example 3, air bubbles are not sufficiently generated in the polyurea resin composition. Accordingly, a lot of time is required to form air bubbles by using the circulating pump, and thus it can be seen that the coating film including Preparation Example 3 and formed on the industrial glove has a creamy phenomenon as illustrated in portion B of FIG. 11. Thus, it can be seen that the coating film of the industrial glove has deteriorated durability and does not secure air permeability.

As described above, referring to Preparation Examples 1 to 3, when the resin composition preparation apparatus according to an embodiment is used, a polyurea resin composition including pores formed due to the dispersed air bubbles having a micrometer-unit size may be prepared. It was confirmed that the polyurea resin composition formed a coating film on a target object and air permeability is also secured due to the pores formed by the dispersed air bubbles.

As is apparent from the foregoing description, an apparatus for preparing a polyurea resin composition capable of forming a coating film on a target object includes an air bubble generator configured to generate air bubbles in the resin composition, which is water-soluble, such that the air bubbles have a micrometer-unit size.

In addition, a polyurea resin composition prepared using the apparatus forms a coating film on fiber or the like and also has air permeability due to air bubbles included therein.

While embodiments of the present disclosure have been described with reference to the accompanying drawings, embodiments of the present disclosure should not be construed as being limited to the embodiments set forth herein and the present disclosure may be embodied in many different forms. In addition, it will be understood by those of ordinary skill in the art to which the present disclosure pertains that the invention may be embodied in other specific forms without departing from the spirit or essential characteristics of the present disclosure. Therefore, it is to be understood that the aforementioned embodiments are illustrative and not restrictive in all aspects.

What is claimed is:

1. A resin composition preparation apparatus comprising:

a resin introduction unit configured to inject a composition solution;

an air bubble generator connected to the resin introduction unit such that the composition solution is introduced thereinto;

wherein the resin introduction unit comprises an air compressor configured to provide air that is mixed with the composition solution before an entry of the composition solution into the air bubble generator or while the composition solution is inside the air bubble generator, and wherein the air bubble generator is configured to disperse a portion of the air in the composition solution in the form of air bubbles and discharge the composition solution;

and an air bubble separation tank connected to the air bubble generator such that the composition solution is introduced thereinto, configured to separate the remaining portion of air which is not dispersed in the composition solution in the form of air bubbles, and which is connected to the resin introduction unit such that the resin composition solution is discharged to the resin introduction unit, wherein the air bubble generator comprises: an inlet through which the composition solution is introduced from the resin introduction unit; an outlet through which the composition solution is discharged to the air bubble separation tank; and an internal flow channel connecting the inlet and the outlet so as to pass the composition solution therethrough, wherein the internal flow channel comprises a groove portion configured to form the air bubbles, and wherein the resin introduction unit further comprises a discharge valve configured to discharge a resin composition.

2. The resin composition preparation apparatus of claim 1, wherein the groove portion is spirally formed along the internal flow channel from the inlet to the outlet, and the internal flow channel allows the air bubbles to be formed by convection applied as the air is rotated by the groove portion.

3. The resin composition preparation apparatus of claim 2, wherein in the air bubble generator, the inlet has a greater diameter than that of the outlet.

4. The resin composition preparation apparatus of claim 1, wherein the resin introduction unit comprises: a resin supply tank to which the composition solution is supplied; a circulating pump connected to the resin supply tank via a first connection pipe and configured to transmit power to the composition solution of the resin supply tank and discharge the composition solution; a pressure pump connected to the circulating pump via a second connection pipe, connected to the air bubble generator via a third connection pipe, and configured to introduce the composition solution into the air bubble generator; and the air compressor connected to at least one fourth connection pipe connected to the second connection pipe or the air bubble generator and configured to inject the air into the second connection pipe or the air bubble generator via the fourth connection pipe.

5. The resin composition preparation apparatus of claim 4, wherein the air bubble generator is connected to the air bubble separation tank via a fifth connection pipe, the resin composition preparation apparatus further comprises an air bubble ejector connected to the air bubble separation tank via a sixth connection pipe and configured to separate and discharge the remaining portion of air which is not dispersed in the composition solution in the form of air bubbles, and the air bubble separation tank is connected to the resin supply tank via a seventh connection pipe and configured to introduce, into the resin supply tank, the composition solution remaining after the remaining portion of air is removed.

6. The resin composition preparation apparatus of claim 1, wherein the groove portion of the internal flow channel is configured to form air bubbles that have a micrometer unit particle size ranging from 45 to 55 micrometers.

* * * * *